Patented Sept. 6, 1932

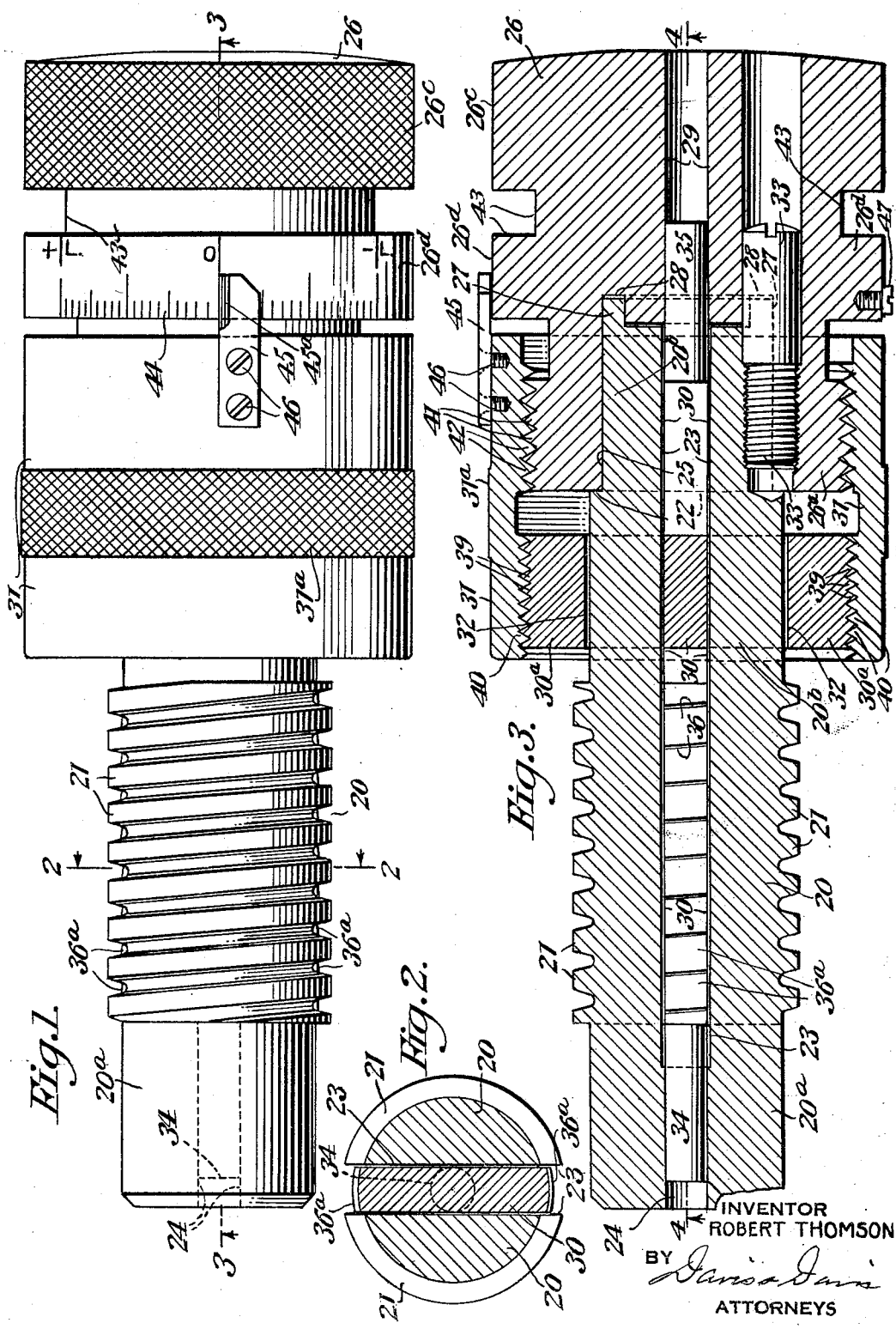

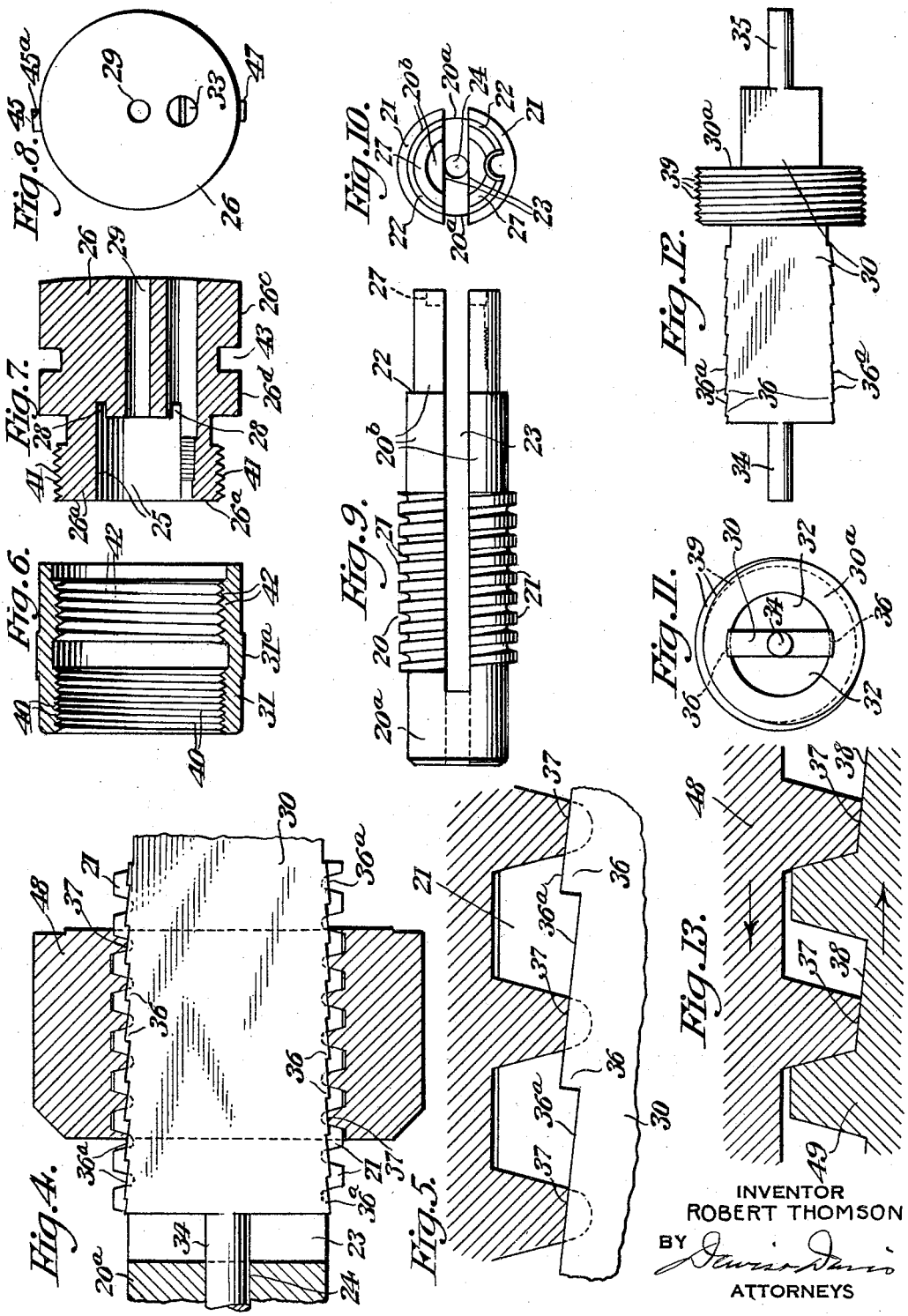

1,875,899

UNITED STATES PATENT OFFICE

ROBERT THOMSON, OF NEWARK, NEW JERSEY, ASSIGNOR TO DARDELET THREADLOCK CORPORATION, OF NEW YORK, N. Y., A CORPORATION OF DELAWARE

SCREW THREAD GAUGE

Application filed December 31, 1929. Serial No. 417,671.

This invention relates to improvements in screw thread gauges, and more particularly to gauges for testing internal screw threads in tapped holes.

The invention has for its principal objects the provision of simple and efficient means for quickly determining whether an internal screw thread is formed with sufficient accuracy for satisfactory use; the provision of a gauge for testing internal threads as to lead, thickness of rib, and root and crest diameters; and the provision of an efficient gauge for testing internal locking screw threads of the well known Dardelet type.

Other objects and advantages of the invention will appear from the following description of the preferred form of gauge illustrated in the accompanying drawings, wherein Fig. 1 is a view of the gauge in elevation, the crest surface testing element being adjusted for seating on the crest surface of an internal thread of nominal or standard size;

Fig. 2 a section on the line 2—2 of Fig. 1;

Fig. 3 a section on the line 3—3 of Fig. 1;

Fig. 4 a fragmentary section on the line 4—4 of Fig. 3 showing a nut on the gauge with a thread complying with the determined standards;

Fig. 5 a view similar to Fig. 4 showing the crest surface testing member adjusted into contact with a thread whose crest surface is displaced farther from the thread axis than prescribed by the predetermined standard;

Figs. 6, 7, 8, 9, 10, 11 and 12 are detail views of various parts of the gauge; and Fig. 13 a fragmentary longitudinal sectional view showing a nut and bolt with internal and external Dardelet threads of proper standard profiles and dimensions in locked relation with each other.

According to the present invention the gauge, which is primarily adapted for use as an inspection gauge, comprises two gauging elements, namely a plug element and a second element adjustable axially of the plug element, which elements control different dimensions of the thread and are adapted for simultaneous reception in the tapped hole of the nut or other internally threaded part to be inspected.

Preferably, and in the construction shown the plug gauge element is of the "go" gauge type and controls all the dimensions except the minor diameter of the internal thread or the extent of radial displacement of the crest surface of the internal thread from the thread axis, which dimension is controlled by the second gauge element.

Preferably, and as shown, the construction of the gauge is such that, when the said second element is adjusted into contact with the crest of the thread of a nut screwed on the plug element, a reading is afforded on the gauge in minute fractions of an inch of the plus or minus variation, if any, from the nominal or standard dimension.

Preferably, and as shown, the construction is such that the nut thread may be first tested by the plug element for checking the thread as to dimensions controlled by said element, and then tested, while still on the plug element, by the second element for checking the crest size or minor diameter of the nut thread.

The plug gauge element 20 has an intermediate portion provided with an external thread 21 and also has a cylindrical entering end portion 20$^a$ which is preferably chamfered at its outer end as shown. The opposite end portion 20$^b$ of element 20 is also cylindrical and this latter portion is reduced in diameter for about half its length inward from its outer end to afford an annular abutment shoulder 22. Element 20 is divided in a plane passing through its axis by a longitudinal slot 23 extending throughout the length of end portion 20$^b$ and the threaded intermediate portion of the element and a short distance into entering end portion 20$^a$, portion 20$^a$ having a cylindrical axial bore 24 of small diameter communicating with the inner or adjacent end of slot 23. The diameter of bore 24 is preferably slightly less than the width of slot 23, which is preferably relatively narrow, as shown. Slot 23 interrupts thread 21 at two diametrically opposed points. The reduced part of end portion 20$^b$ of gauge element 20 fits closely in a cylindrical socket 25 in the adjacent reduced and externally threaded inner end portion 26ª of the head member 26 of the gauge, the outer end of said reduced part having a short longitudinal bore of slightly less diameter than socket 25 to afford two arcuate flanges or lips 27 (one on each part of the split end of the plug element) which seat snugly in an annular groove 28 formed in head 26 to prevent compression of the split plug 20. Head 26 has a cylindrical axial bore 29 of small diameter communicating with socket 25.

The crest surface testing, or minor diameter, gauging, element is slidably mounted in the plug and head to move longitudinally or endwisely of the gauge only. This slidable element comprises a flat bar 30 sufficiently thin to slide without binding in slot 23 of the plug element, and said bar-like gauge element is formed with an integral cylindrical externally threaded collar portion 30ª intermediate its ends of greater diameter than the width of the bar and preferably of the same diameter as the reduced externally threaded cylindrical inner end portion 26ª of the gauge head 26. Collar portion 30ª and head portion 26ª are connected by a double nut or internally threaded adjusting sleeve 31, as more fully hereinafter described. Collar portion 30ª is pierced, as shown as at 32, for passage of the two split parts of the gauge plug therethrough, and the plug and head are held against relative rotation, and also against axial separation, by a threaded dowel pin 33, as shown, with abutment shoulder 22 contacting the inner end face of the gauge head 26.

Gauge element 30 has aligned stub bearing shafts or guiding and supporting plugs 34 and 35 formed integrally therewith at its opposite ends, the outer ends of which plugs extend into the bores 24 and 29 of the plug and head, the main flat body of element 30 being of less length than the slot 23, to thus permit a relative sliding movement between the plug and element 30 longitudinally of the gauge when the double nut or adjusting sleeve 31 is turned.

Element 30 carries on its two longitudinal edges between plug 34 and collar 30ª the two diametrically opposed portions of an interrupted screw thread 36. Threads 21 and 36 are both right hand threads of equal pitch and the thread pitch is constant from end to end of the threads. The thread 21 has the greatest major diameter and the smallest minor diameter, and element 30 is so mounted in the gauge (as more fully hereinafter explained) that one and the same side face of the rib-like body of thread 36 always extends across the several turns of the groove of thread 21 (along two diametrically opposed paths) at points close to, but radially outwardly beyond, the root surface of thread 21. Said side face of the body of thread 36 is thus arranged to form, in effect, an adjustable "false" root surface for thread 21 whereby the minor diameter of the latter thread may be increased and diminished, along two diametrically opposed lines extending lengthwise of plug element 20, by rotary adjustments of the sleeve 31.

In the particular construction shown, which is specifically designed for testing an internal Dardelet thread, the standard profile of which is shown in Figs. 4, 5 and 13, thread 21 has a profile generally similar to that of the well known Acme thread, and thread 36 has a profile generally similar to that of the well known buttress thread with the wider and least steep side face of the thread body facing away from the entering end of plug element 20 and crossing each turn of the groove of thread 21 at two diametrically opposed points, this side face 36ª making transversely thereof an angle of six degrees with the axial line of the plug element corresponding with the angle of the crest surface 37 of the standard Dardelet internal thread and the angle of the root surface 38 of the standard Dardelet external thread. The rib-like body of thread 21 has a wide crest surface parallel with the axis of the plug element, the major diameter of thread 21 corresponding with that of the greatest permissible minus variation from the prescribed nominal major diameter of an internal thread of the size the gauge is designed to test. The thickness of the body of thread 21 and the width of the groove of said thread correspond respectively with the width of the groove and the thickness of the rib-like body of an internal thread whose groove has the greatest permissible minus variation as to width and whose body has the greatest permissible plus variation in thickness from the corresponding nominal dimensions prescribed for the standard thread.

The side faces of the rib-like body of thread 21 flare outwardly from the root and each make an angle of 14½ degrees with a perpendicular to the axis of threads 21 and 36 and plug 20, corresponding with the standard angle for the side faces of the steep-faced rib-like body of a Dardelet thread. Threads 21 and 36 are cut accurately to correspond as to pitch and helix angle with the standards prescribed for a standard Dardelet thread of the size the gauge is designed to test. The root of thread 21 may be rounded as shown, if desired for convenience in cutting, within the root cylinder of thread 36.

The collar portion 30ª of gauge element 30 has an external screw thread 39 engaged with a complementary internal screw thread 40 in that end of adjusting sleeve 31 which is nearest the threaded portion of the plug element 20, while portion 26ª of head member 26 has an external screw thread 41 of the same major diameter but of greater pitch than thread 39, said thread 41 being engaged with a complementary internal screw thread 42 in the opposite end portion of sleeve 31. The adjacent ends of threads 40 and 42 are spaced apart, as shown, and the adjacent ends of collar portion 30ª and head portion 26ª are also spaced apart within the limits of adjustment of the gauge, as shown. An intermediate circumferential surface portion 31ª of the adjusting sleeve 31 is of slightly greater diameter than the remainder of the sleeve and is knurled as shown to afford a convenient hand grip. Head 26 is preferably provided with a circumferential groove 43 affording an outer peripherally knurled hand grip portion 26ᶜ separated from a peripherally graduated rib 26ᵈ. Rib 26ᵈ is located between groove 43 and reduced portion 26ª of the head and its inner side face is spaced from the adjacent end of sleeve 31.

As shown, rib 26ᵈ is of the same diameter as sleeve 31 and is provided with a series of scale graduations 44 on its periphery coactive with edge 45ª of a combined stop and indicator arm 45 rigidly affixed at one end to sleeve 31, as by screws 46, and having its free end overhanging the periphery of rib 26ᵈ. A stop screw 47, tapped radially into rib 26ᵈ, is coactive with arm 45 to prevent turning of sleeve 31 relatively to head 26 for more than one revolution in either direction.

The relative pitches of the two pairs of threads 39—40, and 41—42 is preferably such, as shown, that a turn of the sleeve or double nut 31 through approximately 90 degrees will afford adjustment of slide 30 for threads having the largest and smallest permissible crest sizes or minor diameters. Said thread pitches are also so correlated, as shown, that the crest and narrow side face of thread 36 cannot be carried into the groove of thread 21 within the limit of rotation of sleeve 31 in either direction.

Scale 44 is preferably provided with an "0" graduation which registers with edge 45ª of indicator arm 45 when the gauge is so adjusted that the crest surface of a nut thread of nominal or prescribed standard crest size will seat firmly on the false root surface portions of thread 21 formed by the side face 36ª of thread 36, this adjusted condition of the gauge being shown in Figs. 1, 2, 3 and 4. The scale preferably has permissible plus and minus limit indicating graduations at opposite sides of the "0" graduation, as shown, and intermediate graduations so spaced that each will indicate a variation in minor diameter of a very minute fraction of an inch, preferably 1/10000th of an inch.

The operation of gauging is as follows:

Sleeve 31 is first turned to adjust bar 30 to the extreme left hand limit of its movement as the gauge is viewed in Figs. 1 and 2, in which position the nut thread crest surface contacting face of thread 36 is of no greater, and preferably of lesser, diameter where it extends across the groove of thread 21 than that of the crest of the thread of any nut that will pass the reduced cylindrical entering end portion 20ᵉ of the gauge plug. The diameter of portion 20ª is at least as great, and preferably slightly greater (as shown) than the root diameter of thread 36, and is smaller than the permissible minimum for the minor diameter of acceptable nut threads. Any nut which will not pass portion 20ª must of course be rejected. If the nut passes portion 20ª it may be screwed on to the threaded part of the plug without its crest touching the thread 36 on the slide bar so that it is tested at this time solely by the plug thread for accuracy as to pitch, helix angle, major diameter of thread and proper thread rib thickness and thread groove width. If the nut will screw on the thread 21 it will screw on any acceptable bolt for which the nut was tapped, and will be sufficiently accurate as to the pitch, helix angle and major diameter of its thread. If the rib-like body of the nut thread should be abnormally thin and the thread groove abnormally wide, this condition can be observed by an objectionable extent of direct endwise movement or end shake of the nut on the threaded plug. The extent of end shake, if any, can be noted with reference to a point on the crest of thread 21 or measured from such a point or from the chamfered end of the plug.

If the nut is acceptable so far as gauged by the plug element, the remaining feature to be tested (and one of the most important in connection with the Dardelet thread) is the minor diameter or crest size of the nut thread. In order to determine the accuracy of the nut thread in this respect it is simply necessary to turn sleeve 31 in the reverse direction to slide bar 30 to the right (as viewed in Figs. 1, 2 and 4) until face 36ª of thread 36 seats on the crest surface of the nut thread and resists free turning of the sleeve. If the crest dimension is correct as shown in Fig. 4, the "0" graduation of scale 44 will register with edge portion 45ª of indicator arm 45. If the crest dimension is over-size as shown in Fig. 5 the extent of oversize will be indicated in fractions of an inch by the scale and arm, the edge 45ª of the arm overlying the scale at the plus side of the "0" graduation. If undersize, edge 45ª will overlie the scale at the minus side of the "0" graduation. If edge 45ª lies outside the zone between the plus and minus limit graduations of scale 44 the nut must be rejected.

The nut 48 shown in Figs. 4, 5 and 13 is adapted for use on a bolt 49 as shown in Fig. 13, the nut and bolt being threaded with the well known Dardelet self-locking threads in which the steep-faced rib-like thread bodies are materially narrower than the thread grooves and the slightly conical crest surface 37 of the nut thread is adapted to wedge upon the correspondingly tapered root surface 38 of the bolt thread when the nut is screwed up against the work, as more fully explained in U. S. patent to Dardelet No. 1,657,244. While the gauge shown is particularly adapted for testing internal Dardelet threads, it will be obvious that gauges may be constructed, without departing from the scope of the invention, suitable for testing other types of threads.

What I claim is:

1. A gauge for internal screw threads, comprising a longitudinally slotted plug having an external thread interrupted by the plug slot for testing an internal thread for pitch, thickness and major diameter, a member slidable in the plug slot and having an interrupted thread one side face of which extends across the groove of the plug thread and is inclined to the perpendicular to the plug thread axis, and means for slidably adjusting said member in the plug slot for displacing said side face into engagement with the crest of an internal thread screwed on the plug to test the internal thread as to minor diameter.

2. A gauge as claimed in claim 1, characterized by the fact that means are provided for indicating whether the minor diameter of a gauged thread corresponds with the prescribed nominal minor diameter and for indicating the amount of over or under size, if any.

3. A gauge for internal screw threads, comprising a handle portion, a gauging plug having an external thread for testing an internal thread as to pitch and major diameter, said plug having a longitudinal slot extending through its axis and interrupting its thread along opposite sides of the plug, a gauging bar slidably mounted in the plug slot and carrying on its longitudinal edges portions of a minor diameter testing thread one side face of which extends across the groove of the plug thread in all relatively adjusted positions of the plug and bar and makes an angle with a perpendicular to the axes of said threads, said testing threads having coincident axes and being of the same pitch, means rigidly holding the handle portion to one end of the plug, said handle portion and bar having adjacent portions provided with external screw threads of different pitch, and a double nut for effecting adjustments between the plug and bar having internal screw threads of different pitch in opposite ends of its bore engaged with the last mentioned threads, each thread of the nut having the same pitch as the thread with which it is engaged.

4. A gauge as claimed in claim 3, characterized by the fact that means are provided on the double nut and handle portion coactive to visually indicate variations between the minor diameter of a gauged thread and a standard nominal minor diameter.

5. A gauge as claimed in claim 3, characterized by the fact that stop means are provided on the nut and handle portion for determining the limits of adjustment between the plug and bar.

6. A gauge as claimed in claim 3, characterized by the fact that the bar is provided with plug-like extensions at its ends projecting into registering bores in the plug and handle portion.

7. A gauge as claimed in claim 3, characterized by the fact that means are provided for determining a minimum setting of the minor diameter gauging bar, and the further fact that said plug has a reduced non-threaded cylindrical entering end portion the diameter of which is at least as great as the minimum diameter for which said gauging bar is settable.

8. In a nut thread gauge, the combination of a nut-entering plug externally threaded for the screwing thereon of a nut to be gauged, said plug having a longitudinal slot interrupting both the root and body of its thread, and a minor diameter gauging member having a bar-like portion slidable in said plug slot endwisely of said member and plug, said bar-like portion having a longitudinal row of nut thread crest engaging edge faces each variably displaceable across a different turn of the thread groove of the plug by relative endwise adjustments of the plug and member and all inclined to the axis of the plug thread toward one and the same end of the plug.

9. A nut thread gauge as claimed in claim 8, wherein connecting and adjusting means are provided at one end of the plug connecting the plug and member for endwise adjustments therebetween within fixed limits, and wherein said edge faces each extends entirely across one turn of the plug thread groove in all relatively adjusted positions of the plug and member.

In testimony whereof I hereunto affix my signature.

ROBERT THOMSON.